D. LYNAHAN.
Peg-Floats.
No. 155,618.
Patented Oct. 6, 1874.
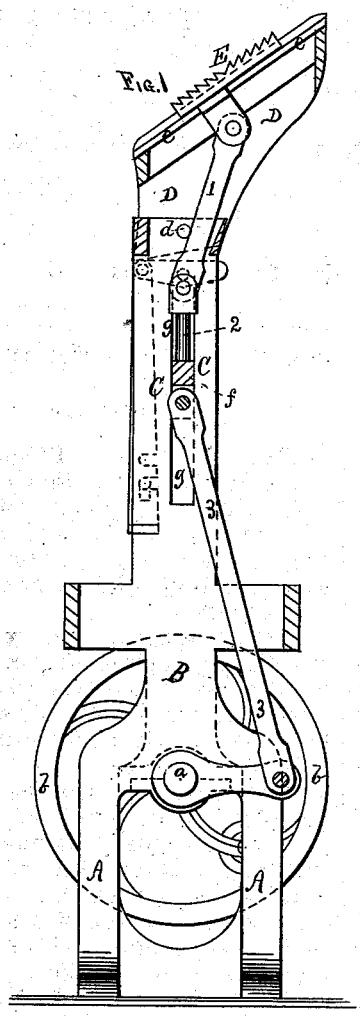
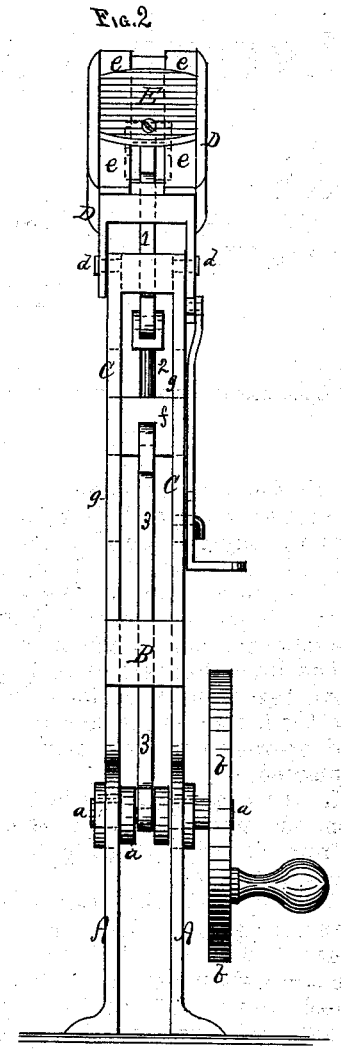
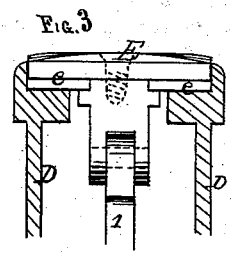
WITNESSES.
C. N. Woodward
J. H. Parsons
Daniel Lynahan,
INVENTOR, BY
Burke, Fraser & Co.
Attys.

UNITED STATES PATENT OFFICE.

DANIEL LYNAHAN, OF BUFFALO, NEW YORK, ASSIGNOR OF TWO-THIRDS HIS RIGHT TO FRANCIS G. FRALICK AND DAVID B. SHERMAN, OF SAME PLACE.

IMPROVEMENT IN PEG-FLOATS.

Specification forming part of Letters Patent No. 155,618, dated October 6, 1874; application filed June 22, 1874.

*To all whom it may concern:*

Be it known that I, DANIEL LYNAHAN, assignor to myself and Francis G. Fralick and David B. Sherman, all of Buffalo, in the county of Erie and State of New York, have invented certain Improvements in Peg-Floats, of which the following is a specification:

The invention relates to peg-cutters to remove pegs from the inside of boots and shoes; and the invention consists in the construction and operation of the machine, as hereinafter explained.

In the drawings, Figure 1 is a side elevation, one side of the upright removed; Fig. 2, front elevation, and Fig. 3 a detail view, of floats and slides.

A A represent the base or legs which support the machine, which will be attached to a bench or the floor. B is the frame in which the crank-shaft $a$ moves; and $b$, the operating-wheel, which will be run by an attached treadle. C C are uprights above the frame B, and above this the float-frame D is pivoted, as shown at $d$. This is done to give a greater or less slant to the float, as is common; otherwise the frame D would form part of the uprights C C. E is the float, which moves up and down on the inclined slides $e\ e$ by means of a series of jointed upright shafts or connecting-rods, 1 2 3, shaft No. 1 being attached to the float, shaft 2 to that, and provided with a cross-head or guide, $f$, which works in slots $g$ in uprights C. Shaft 3 is attached either to the cross-head or guide $f$ or below it, and the other end is attached to and operated by the crank-shaft $a$.

The advantages of this construction are its simplicity and strength, not liable to get out of order, as is the case with others for the same purpose, and it obviates the labor by hand, as it works by a treadle.

I claim—

1. The combination of the peg-cutter E with the jointed shafts 1 2 3, guide or cross-head $f$, and the uprights C, having the slots $g$, substantially as and for the purpose described.

2. The peg-cutter E, arranged on the inclined slides $e\ e$, in combination with the jointed shafts 1 2 3, guide or cross-head $f$, and the uprights C, having the slots $g$, substantially as and for the purpose described.

In witness whereof I have hereunto signed my name in the presence of two subscribing witnesses.

DANIEL LYNAHAN.

Witnesses:
J. R. DRAKE,
T. H. PARSONS.